(12) United States Patent
Wakao et al.

(10) Patent No.: US 7,423,393 B2
(45) Date of Patent: Sep. 9, 2008

(54) CAR CONTROL METHOD AND CAR CONTROL APPARATUS

(75) Inventors: Yasumichi Wakao, Tokyo (JP); Keizo Akutagawa, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/512,429

(22) PCT Filed: May 6, 2003

(86) PCT No.: PCT/JP03/05658

§ 371 (c)(1),
(2), (4) Date: Jul. 5, 2005

(87) PCT Pub. No.: WO03/095261

PCT Pub. Date: Nov. 20, 2003

(65) Prior Publication Data

US 2005/0274560 A1 Dec. 15, 2005

(30) Foreign Application Priority Data

May 7, 2002 (JP) .............................. 2002-132008

(51) Int. Cl.
*H02K 23/68* (2006.01)
(52) U.S. Cl. .................... 318/371; 318/372; 318/373; 318/374; 318/375; 318/432; 318/433; 318/434; 318/650; 318/651; 318/652
(58) Field of Classification Search ......... 318/650–652, 318/371–375, 432–434
See application file for complete search history.

(56) References Cited

U.S. PATENT DOCUMENTS

| 5,973,463 | A | * | 10/1999 | Okuda et al. ................. 318/430 |
| 6,434,469 | B1 | * | 8/2002 | Shimizu et al. ............... 701/84 |
| 6,450,586 | B1 | * | 9/2002 | Nagano ......................... 303/2 |
| 6,453,228 | B1 | * | 9/2002 | Shimada ....................... 701/89 |
| 6,607,253 | B1 | * | 8/2003 | Yamamoto et al. ........... 303/112 |
| 6,616,250 | B1 | * | 9/2003 | Fennel et al. ................ 303/139 |
| 6,678,597 | B2 | * | 1/2004 | Amberkar ..................... 701/41 |
| 6,838,854 | B2 | * | 1/2005 | Inagaki et al. ............... 318/701 |
| 2002/0060545 | A1 | * | 5/2002 | Inagaki et al. ............... 318/629 |
| 2002/0107617 | A1 | * | 8/2002 | Tomikawa .................... 701/22 |

FOREIGN PATENT DOCUMENTS

| CN | 1128712 A |   | 8/1996 |
| CN | 1242641 A |   | 1/2000 |
| JP | 8-294204 A |   | 11/1996 |
| JP | 09-215106 | * | 8/1997 |
| JP | 9-215106 A |   | 8/1997 |
| JP | 10-210604 A |   | 8/1998 |
| JP | 11-187506 | * | 7/1999 |
| JP | 11-187506 A |   | 7/1999 |
| JP | 2000-217209 A |   | 8/2000 |
| JP | 2003-9566 A |   | 1/2003 |

* cited by examiner

*Primary Examiner*—Rita Leykin
(74) *Attorney, Agent, or Firm*—Sughrue Mion, PLLC

(57) ABSTRACT

A car control apparatus including a wheel sensor, wheel torque calculating means for calculating wheel torque from the wheel speed, drive force detecting means for detecting drive force generated by an electric motor, car body drive force calculating means for calculating car body drive force from the above drive force and wheel torque, car body drive force fluctuating component extracting means for extracting multiple frequency band fluctuating components of the car body drive force, and drive or braking force control unit for controlling the running state of a car.

29 Claims, 10 Drawing Sheets

FIG.6(a) Fm, Vm frequency-dependence
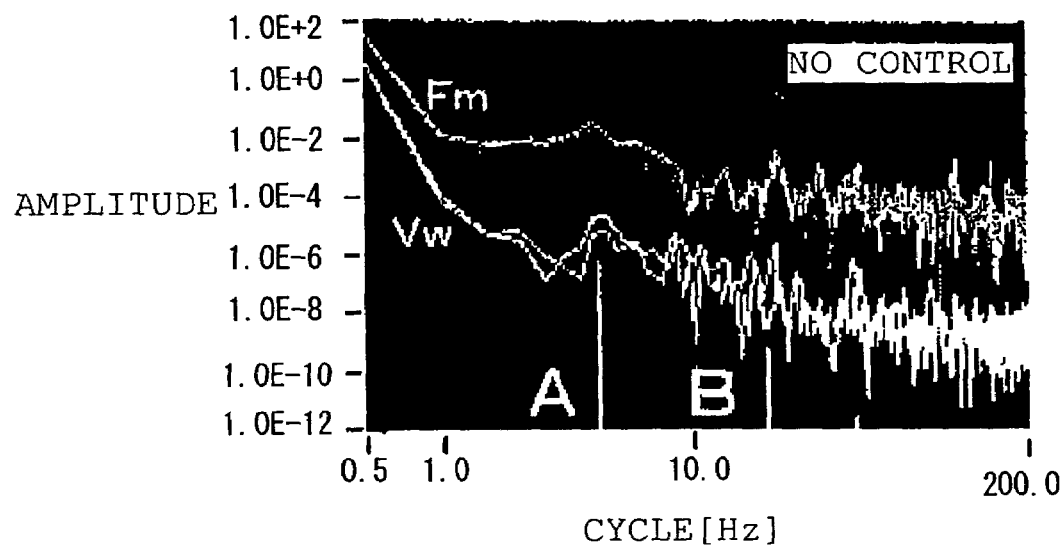
FIG.6(b) Fm, Vm frequency-dependence
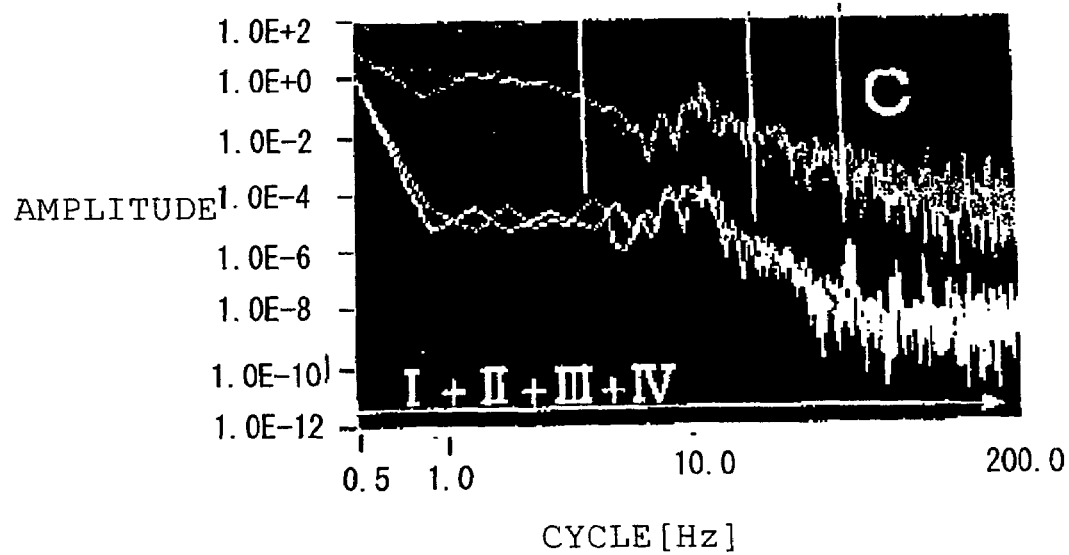

CAR CONTROL METHOD AND CAR CONTROL APPARATUS

BACKGROUND OF THE INVENTION

1. Field of the Invention

The present invention relates to a car control method and, specifically, to a car control method for suitably controlling drive or braking force applied to wheels and suppressing disturbance applied to tires and an apparatus for use in the method.

2. Description of the Prior Art

In the prior art, to control the running state of a car by controlling drive force applied to drive wheels, in the case of an engine-drive car, the target engine speed is calculated based on the input acceleration signal, and the opening of a throttle valve is controlled to adjust the engine speed so that the actual car speed detected by a car speed sensor becomes a car speed calculated from the above target engine speed so as to control drive torque applied to an output shaft connected to the drive wheels.

In an electric car in which drive wheels are driven or braked by an electric motor, as shown in the control flow of FIG. 12, the output torque of an electric motor 50M for driving or braking drive wheels 50R is detected by drive torque detection means 51, the wheel speed is detected by a wheel speed sensor 52, the target wheel speed in a sticky state is calculated from the target drive force (motor torque instruction value) for obtaining required drive torque and the detected output torque of the motor by target wheel speed calculating means 53 so that the above detected wheel speed becomes the above target wheel speed, and drive or braking force generated by the above electric motor 50M is controlled by motor drive and control means 54 to adjust drive or braking force applied to the drive wheels 50R. At this point, the ratio of the above wheel torque to car body drive force is controlled to become equal to the ratio of the mass of the wheels to the mass of the car body. The motor drive and control means 54 controls the size of a current running through the above electric motor 50M by detecting the torque of the output shaft of the motor or directly detecting a motor current.

When the vibration of the car is caused by fluctuations in the output torque of the electric motor 50M, as means of controlling this vibration, for example, there are proposed a method in which motor torque is detected as a motor revolution angle $\theta m$ or a motor revolution speed $\omega m$, the difference "e" between this $\theta m$ or $\omega m$ and the estimated value $\theta me$ of the motor revolution angle or the estimated value $\omega me$ of the motor revolution speed based on a plant model is calculated and disturbance torque is estimated from this difference "e" to control motor torque to be input into the actual plant (for example, see Japanese Laid-open Patent Application No. 2000-217209) and a method in which the difference $\Delta \omega$ between the average revolution $\omega M$ of the motor and the average revolution $\omega b$ of the drive wheels is calculated by detecting these and a torque instruction value $\tau M$ to be input into the motor is corrected with a correction value $\tau'$ obtained by multiplying this difference $\Delta \omega$ by a gain k (for example, see Japanese Laid-open Patent Application No. 2002-152916).

For a car having an SR motor driven by a switching circuit, there is also proposed a method in which a signal having a resonance frequency band is extracted from a motor revolution signal detected from the motor by a bandpass filter and fed back to reduce fluctuations in the revolution of a motor shaft caused by the vibration of the motor due to the resonance of the motor or the car body (for example, see Japanese Laid-open Patent Application No. 2002-171778).

In the above car control, to control the attitude of the car or car speed detected by a yaw rate sensor or car speed sensor, drive or braking force applied to the drive wheels is controlled according to the time constant of the behavior of the car to be controlled.

Stated more specifically, a high-frequency component which becomes a noise component to the behavior of the car is removed by a low-pass filter in the loop to control drive or braking force applied to the drive wheels at a control cycle of about 100 msec to 10 sec in an engine-drive car or at a control cycle of about 1 msec to 10 sec in an electric car.

When the car runs on a road having a low coefficient of friction, the running state of the car is controlled based on the estimated coefficient of road friction. As means of estimating the coefficient of road friction, for example, there is proposed a method in which the vibration of the wheel speed is extracted to improve the accuracy of response output to an input into a wheel resonance system including friction characteristics between the tires and the road surface, only a cyclic vibration is selected from this vibration of the wheel speed, and the transmission function of the wheel resonance system is identified based on this cyclic vibration (see Japanese Laid-open Patent Application No. 11-178120).

To suppress the spinning of the wheels when a car suddenly starts to run on a road having a low coefficient of friction, as shown in FIG. 12, the car body speed is detected by a car body speed sensor 55, the slip ratio which is determined by the speed difference between the wheel speed and the car body speed generated by the spinning of the wheels from the above detected car body speed and the wheel speed detected by the wheel sensor 52 is calculated by slip ratio calculating means 56, and the above target wheel speed is corrected so that the above slip ratio becomes a preset slip ratio to suppress a rise in the above slip ratio, thereby shorting the drive or braking distance. Since drive or braking force applied to the drive wheels is controlled based on information on the behavior of the car, this control is also carried out at the same control frequency.

There is also proposed a method in which the acceleration of the drive wheels is detected by an acceleration sensor in place of the slip ratio calculated from the speed difference between the car body speed and the wheel speed and it is judged whether the car slips or not from the relationship between the output of this acceleration sensor and an increase in the revolution of the drive wheels. When it is judged that the car slips, the motor torque is reduced (for example, see Japanese Laid-open Patent Application No. 11-178120).

There is further proposed a method in which, by applying micro-vibration having a higher frequency than the response frequency of the car body to the tires according to the condition of the road in order to change friction force between the tires and the road surface, the running state of the car is controlled by adjusting the friction force of the tires while the slip ratio or slip angle of the tires is kept constant (for example, see the pamphlet of WO02/00463).

However, since the influence of disturbance (micro-vibration) applied to the tires caused by fluctuations in the contact pressure of the tires due to changes in the condition of the road and changes in the vibration of unsprung mass including the suspension and having a cycle of 100 msec or less cannot be compensated for by the general control of the above engine-drive car, the road holding properties of the tires deteriorate. Meanwhile, in the electric car, although shorter cyclic control than that of the engine-drive car is possible, a higher frequency band fluctuating component than the response frequency of the car body included in the above detected motor torque and wheel speed cannot be specified, thereby making it impossible to compensate for the influence of disturbance applied to the tires.

Since only the friction force of the tires is controlled in the method in which micro-vibration is directly applied to the tires, it cannot be said that the control of the attitude of the car and the car speed is satisfactory.

Further, as the control of the attitude of the car and the car speed and the control of the slip ratio are carried out at the same control frequency range, over-feedback occurs for the control of the attitude of the car and the car speed. Thus, satisfactory car control is impossible.

It is an object of the present invention which has been made in view of the above problems of the prior art to provide a car control method capable of improving the road holding properties of the tires by compensating for disturbance applied to the tires and the driving stability of the car and an apparatus used in the method.

SUMMARY OF THE INVENTION

The inventors of the present invention have conducted intensive studies and have found that the running state of a car can be stabilized by extracting a change in wheel speed or car body drive force and suppressing the extracted change in wheel speed or car body drive force. The present invention has been accomplished based on this finding. Stated more specifically, a change in the attitude of the car body or car speed included in any one of wheel speed detected by a wheel sensor and car body drive force for moving forward the car body generated on the tire contact surface and obtained from drive force and wheel torque applied to each drive wheel and further fluctuating components caused by the disturbance of each tire are separated and extracted to be fed back to the target drive force directly, or drive force or braking force to be applied to the drive wheel is controlled according to these fluctuating components, and further vibration is applied to the tire to suppress the deformation of the tire caused by the above tire disturbance, thereby suppressing vibration caused by a change in drive force or the above disturbance. Thus, stable car control becomes possible.

According to a first aspect of the present invention, there is provided a car control method comprising the steps of:

detecting drive force and wheel torque applied to each drive wheel;

calculating car body drive force from the above detected drive force and wheel torque;

extracting at least one frequency band fluctuating component of the calculated car body drive force; and driving or braking the wheel or applying vibration to the wheel based on the extracted fluctuating component of the car body drive force to control the running state of the car.

According to a second aspect of the present invention, there is provided a car control method, wherein multiple frequency band fluctuating components of the calculated car body drive force are extracted to control drive or braking force applied to the drive wheel based on the extracted fluctuating components of the car body drive force. Thereby, the controls of driving or braking the car, car attitude, the suppression of a rise in slip ratio and the compensation of tire disturbance can be carried out at the same time and accurately.

According to a third aspect of the present invention, there is provided a car control method, wherein, in an engine-drive car, drive force applied to the output shaft of the drive wheel is detected, and fluctuating components including at least a frequency band of 10 Hz to 1 kHz are extracted from car body drive force calculated from the drive force and wheel torque to control the running state of the car based on the above extracted fluctuating components. Thereby, the influence of disturbance (micro-vibration) applied to each tire caused by a change in the vertical pressure of the tire due to a change in the condition of the road and a change in the vibration of unsprung mass including the suspension and having a cycle of 100 msec or less can be compensated for, and the road holding properties of the tire can be thereby improved.

According to a fourth aspect of the present invention, there is provided a car control method, wherein, in a car driven or braked by a motor, drive or braking force generated by a motor for driving or braking the drive wheel is detected, and fluctuating components including at least a frequency band of 10 Hz to 10 kHz are extracted from car body drive force calculated from the drive or braking force and wheel torque. Thereby, the influence of disturbance (micro-vibration) applied to each tire caused by a change in the vertical pressure of the tire due to a change in the condition of the road and a change in the vibration of unsprung mass including the suspension and having a cycle of 100 msec or less can be compensated for without fail, and the road holding properties of the tire can be thereby further improved.

According to a fifth aspect of the present invention, there is provided a car control method, wherein a 10 Hz to 200 Hz fluctuating component out of the fluctuating components of the car body drive force is extracted to suppress a change in the car body drive force. Thereby, disturbance at a tire dynamic frequency band lower than the micro-vibration caused by the influence of the pattern block or sipe of the tread and caused by the natural vibration of a tire case out of the above 10 Hz to 10 kHz fluctuating components is suppressed to reduce a change in the car body drive force.

According to a sixth aspect of the present invention, there is provided a car control method, wherein a 30 to 100 Hz fluctuating component out of the fluctuating components of the car body drive force is extracted to suppress a change in the car body drive force. Thereby, disturbance at a frequency close to the resonance frequencies of the longitudinal spring and front and rear springs of the tire out of the above 10 Hz to 10 kHz fluctuating components can be suppressed.

According to a fourth aspect of the present invention, there is provided a car control method, wherein left and right drive wheels are controlled independently. Unlike torque distribution by a differential such as a gear in the prior art, there is no limitation by the drive torque of the other drive wheel, thereby making it possible to set the drive torques of the left and right drive wheels to suitable values.

According to an eighth aspect of the present invention, there is provided a car control method, therein the left and right drive wheels are controlled independently based on a change in steering properties. Since a change in steering properties can be thereby suppressed, the attitude of the car and the car speed can be controlled without fail.

According to a ninth aspect of the present invention, there is provided a car control method, wherein the running state of the car is controlled based on a vertical load applied to each tire. A change in friction force between the tire and the road surface caused by a change in the vertical load applied to the tire can be compensated for, thereby making it possible to further improve the controllability of the car.

According to a tenth aspect of the present invention, there is provided a car control method, wherein at least one frequency band change in the wheel such as wheel speed or wheel torque is extracted and the drive wheel is driven or braked so that a change in the wheel is suppressed based on the extracted change in the wheel.

According to an eleventh aspect of the present invention, there is provided a car control method; wherein a change including at least a frequency band of 10 Hz to 10 kHz in the wheel is extracted and the drive or braking force of the motor for driving or braking the drive wheel is controlled with this extracted change in the wheel.

According to a twelfth aspect of the present invention, there is provided a car control apparatus comprising:

means of detecting the wheel speed of each drive wheel;

means of calculating wheel torque from the detected wheel speed;

means of detecting drive force applied to the drive wheel;

means of calculating car body drive force from the drive force and wheel torque;

means of extracting at least one frequency band fluctuating component from the calculated car body drive force; and running state control means for controlling the running state of a car based on the extracted fluctuating component of the car body drive force.

A change in the attitude of the car or the speed of the car included in the fluctuating component of the car body drive force and further a fluctuating component caused by tire disturbance are separated and extracted to control the running state of the car based on these fluctuating components, thereby improving the controllability of the car.

According to a thirteenth aspect of the present invention, there is provided a car control apparatus, wherein drive or braking force generated by a motor for driving or braking the drive wheel is detected to detect drive or braking force applied to the drive wheel.

According to a fourteenth aspect of the present invention, there is provided a car control apparatus, wherein the running state control means has means of driving or braking the wheel based on the extracted fluctuating component of the car body drive force.

According to a fifteenth aspect of the present invention, there is provided a car control apparatus, wherein means of calculating the speed difference between the car body speed and the wheel speed by extracting a 0.2 Hz to 100 Hz frequency band fluctuating component of the car body drive force is provided to drive or brake the wheel based on the calculated speed difference. This makes it possible to carry out the suitable control of the wheel by suppressing a rise in the slip ratio.

According to a sixteenth aspect of the present invention, there is provided a car control apparatus, wherein left and right drive wheels are controlled independently. Thereby, the turning stability of the car is improved.

According to a seventeenth aspect of the present invention, there is provided a car control apparatus, wherein means of extracting 10 Hz or lower frequency band fluctuating components of the car body drive forces of the left and right drive wheels are provided to control the left and right drive wheels independently based on the respective extracted fluctuating components. Thereby, instability caused by a change in steering properties is suppressed to secure the control of the attitude of the car or the control of the car speed.

According to an eighteenth aspect of the present invention, there is provided a car control apparatus which comprises means of detecting the steering angle of a steering system, means of detecting the yaw rate of the car body, means of detecting a change in steering properties from the detected steering angle and yaw rate and judging the instability of the car body and which drives or brakes one or both of a drive wheel on the inner side of turning and a drive wheel on the outer side of turning according to the change in steering properties when it is judged that the car body is unstable. Thereby, the stability of attitude control can be further improved.

According to a nineteenth aspect of the present invention, there is provided a car control apparatus, wherein the running state control means has means of applying vibration to the tire to compensate for the influence of micro-vibration applied to the tire.

According to a twentieth aspect of the present invention, there is provided a car control apparatus, wherein means of calculating disturbance applied to the tire by extracting a 10 Hz to 10 kHz frequency band fluctuating component of the car body drive force is provided to apply vibration to the tire based on the calculated disturbance.

According to a twenty-first aspect of the present invention, there is provided a car control apparatus, wherein a 10 Hz to 200 Hz frequency band fluctuating component out of the fluctuating components of the car body drive force is extracted to suppress disturbance at a tire dynamic frequency band caused by the natural vibration of a tire case included in the fluctuating component, thereby reducing a change in the car body drive force.

According to a twenty-second aspect of the present invention, there is provided a car control apparatus, wherein a 30 Hz to 100 Hz frequency band fluctuating component out of the fluctuating components of the car body drive force is extracted to suppress disturbance at a frequency near the resonance frequencies of the longitudinal spring and front and rear springs of the tire included in the above fluctuating component, thereby reducing a change in the car body drive force.

According to a twenty-third aspect of the present invention, there is provided a car control apparatus, wherein means of detecting a vertical load applied to the tire is provided to control the running state of the car based on the detected vertical load. Since a change in friction force between the tire and the road surface caused by a change in the vertical load applied to the tire can be thereby compensated for, the controllability of the car can be further improved.

According to a twenty-fourth aspect of the present invention, there is provided a car control apparatus which further comprises means of detecting the displacement of a suspension, means of detecting the normal acceleration of the wheel and means of calculating the vertical load from the detected displacement of the suspension and the normal acceleration of the wheel. Thereby, a vertical load applied to the tire can be detected.

According to a twenty-fifth aspect of the present invention, there is provided a car control apparatus comprising:

means of detecting the wheel speed of each drive wheel;

means of extracting at least a 10 Hz to 10 kHz frequency band fluctuating component of the detected wheel speed; and running state control means for correcting drive or braking force generated by a motor for driving or braking the drive wheel with the extracted fluctuating component of the wheel speed.

Thereby, the running state of the car can be stabilized by reducing a change in the wheel speed caused by tire disturbance.

According to a twenty-sixth aspect of the present invention, there is provided a car control apparatus, wherein the motor is a direct drive motor for directly driving the drive wheel.

According to a twenty-seventh aspect of the present invention, there is provided a car control apparatus, wherein the motor is an in-wheel motor for driving the wheel with an electric motor attached to the wheel.

According to a twenty-eighth aspect of the present invention, there is provided a car control apparatus, wherein the motor is a gearless direct drive in-wheel motor. Thereby, vibration caused by the back-crash of the gears is eliminated to carry out control at a high frequency without fail.

According to a twenty-ninth aspect of the present invention, there is provided a car control apparatus, wherein the motor is attached to one or both of an unsprung mass side and a sprung mass side through a buffer member or buffer device. This is aimed to reduce the change level of road holding force when the car runs on an uneven road. Thereby, the frequency range to be controlled is narrowed, the degree of freedom of selecting a control frequency increases, and the change level itself becomes small, thereby making it possible to facilitate control at a high frequency range.

BRIEF DESCRIPTION OF THE DRAWINGS

FIGS. 6(a) and 6(b) are diagrams showing the effect of suppressing tire disturbance of the present invention;

DESCRIPTION OF THE PREFERRED EMBODIMENTS

Preferred embodiments of the present invention will be described hereinbelow with reference to the accompanying drawings.

Figure 1:
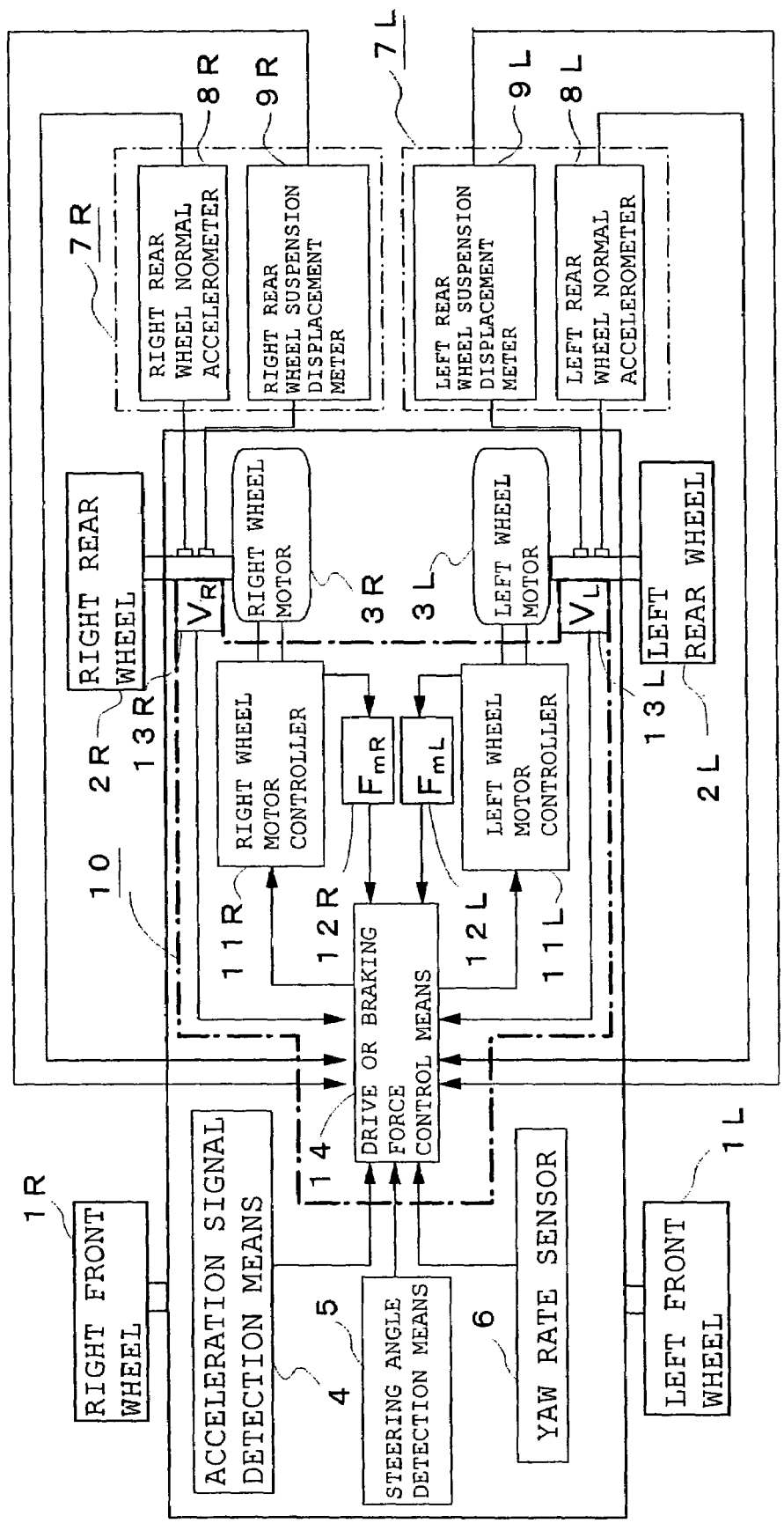
FIG. 1 is a diagram showing the constitution of a car equipped with the car control apparatus of the present invention.
Figure 2:
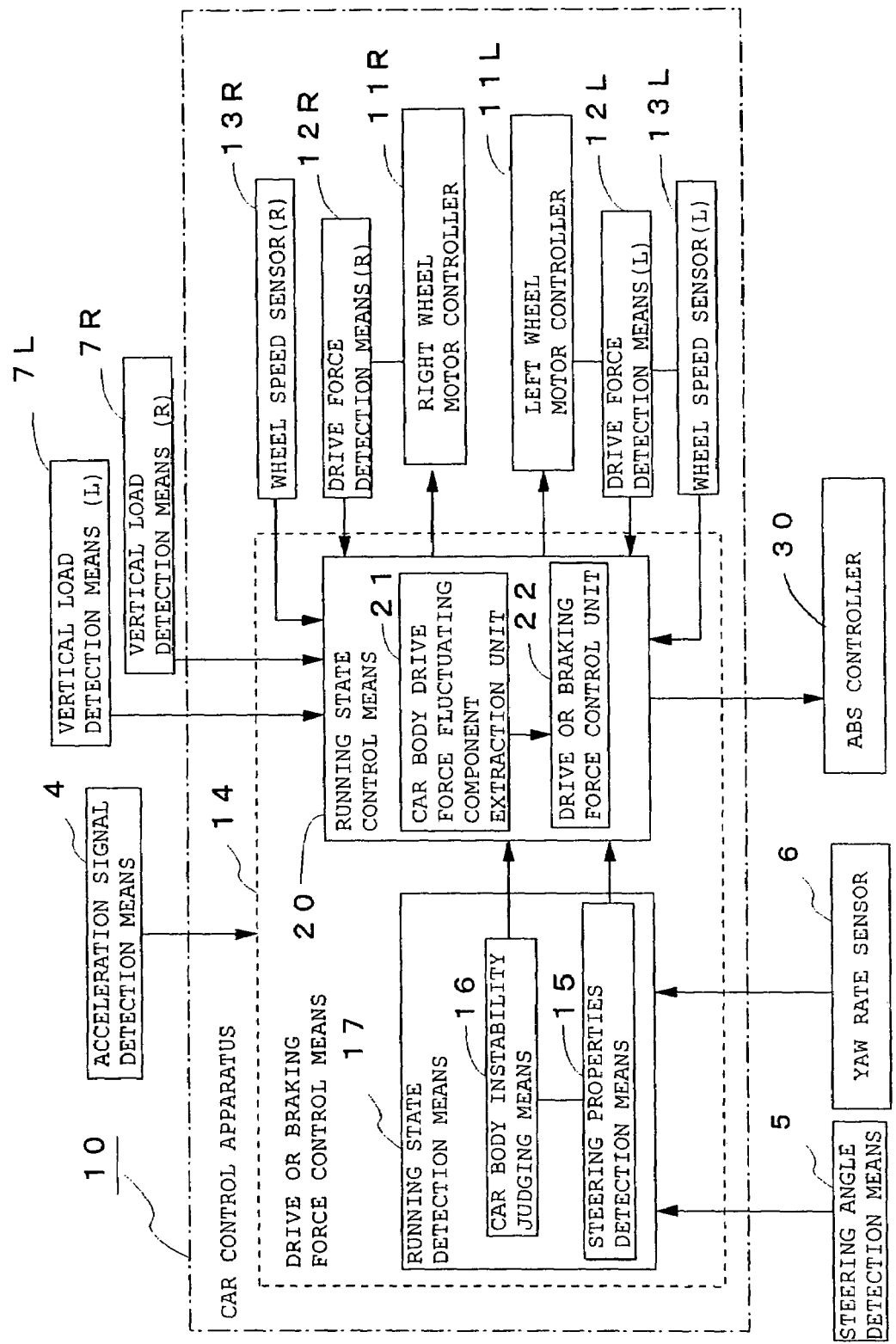
FIG. 2 is a diagram showing the constitution of the car control apparatus according to an embodiment of the present invention.

FIG. 1 is a diagram showing the constitution of a car equipped with a car control apparatus 10 according to the present invention, and FIG. 2 is a control block diagram of the above car control apparatus 10. In this embodiment, a two-wheel independent control electric car in which right and left rear wheels are independently controlled by two electric motors will be described. In these figures, 1L and 1R denote left and right front wheels, 2L and 2R left and right drive rear wheels, and 3L and 3R electric motors for driving or braking the above left and right rear wheels (to be referred to as "drive wheels" hereinafter), respectively. Direct drive motors for directly driving or braking the drive wheels 2L and 2R are preferred, and outer rotor or inner rotor type in-wheel motors are particularly preferred as the electric motors 3L and 3R (in FIG. 1, the electric motors 3L and 3R are shown outside the drive wheels 2L and 2R for the easy understanding of the constitution of the present invention).

Reference numeral 4 denotes acceleration signal detection means for detecting the opening of an unshown accelerator and outputting a car required drive force signal, 5 steering angle detection means for detecting the steering angle of a steering system, 6 a yaw rate sensor for detecting the yaw rate of the car body, 7L and 7R vertical load detection means which comprise normal accelerometers 8L and 8R attached to left and right rear wheels and suspension displacement meters 9L and 9R attached to left and right suspensions, for detecting vertical loads applied to the tires of the left and right drive wheels 2L and 2R, respectively, and 10 a car control apparatus which comprises left and right motor controllers 11L and 11R for driving and controlling the electric motors 3L and 3R for driving the drive wheels 2L and 2R, drive force detection means 12L and 12R for detecting drive or braking forces for the drive wheels 2L and 2R output from the motor controllers 11L and 11R, respectively, wheel speed sensors 13L and 13R for detecting the revolution speeds of the above drive wheels 2L and 2R, respectively, and drive or braking force control means 14 for extracting a fluctuating component of car body drive force from the drive or braking forces detected by the above drive force detection means 12L and 12R and the wheel speeds detected by the wheel speed sensors 13L and 13R to calculate drive or braking forces applied to the left and right drive wheels 2L and 2R and outputting these to the above left and right motor controllers 11L and 11R and for driving or braking the left and right drive wheels 2L and 2R by controlling unshown braking means such as an ABS controller.

As the above wheel speed sensors 13L and 13R are preferably used a sensor for generating 100 pulses or more per revolution of the wheel or a sensor having a revolution resolution of $1/100$ or more to obtain a control cycle of 5 msec or less, more preferably used a sensor for generating 500 pulses or more per revolution of the wheel or a sensor having a revolution resolution of $1/500$ or more.

As shown in FIG. 2, the drive or braking force control means 14 comprises (1) running state detection means 17 for detecting the running state of the car, which has steering property detection means 15 for detecting changes in steering properties from a steering angle signal from the steering angle detection means 5 and a yaw rate signal from the yaw rate sensor 6 and car instability judging means 16 for judging the instability of the car from the detected steering properties, and (2) running state control means 20 for controlling the running state of the car, which has a car body drive force fluctuating component extraction unit 21 for calculating car body drive force from a required drive force signal from the acceleration signal detection means 4, drive or braking forces applied to the left and right drive wheels 2L and 2R detected by the left and right drive force detection means 12L and 12R and wheel speed signals from the wheel speed sensors 13L and 13R and extracting fluctuating components of the above car body drive force and a drive or braking force control unit 22 for calculating drive or braking forces applied to the left and right drive wheels 2L and 2R based on the above extracted fluctuating components of the car body drive force, the running state of the car detected by the above running state detection means 17 and vertical loads from the vertical load detection means 7L and 7R and outputting them to the left and right motor controllers 11L and 11R and the ABS controller 30. The drive or braking force control means 14 drives or brakes the left and right drive wheels 2L and 2R and the front wheels 1L and 1R and controls drive or braking forces for the left and right drive wheels 2L and 2R independently according to the above change in steering properties when it is judged that the car body is unstable.

Figure 3:
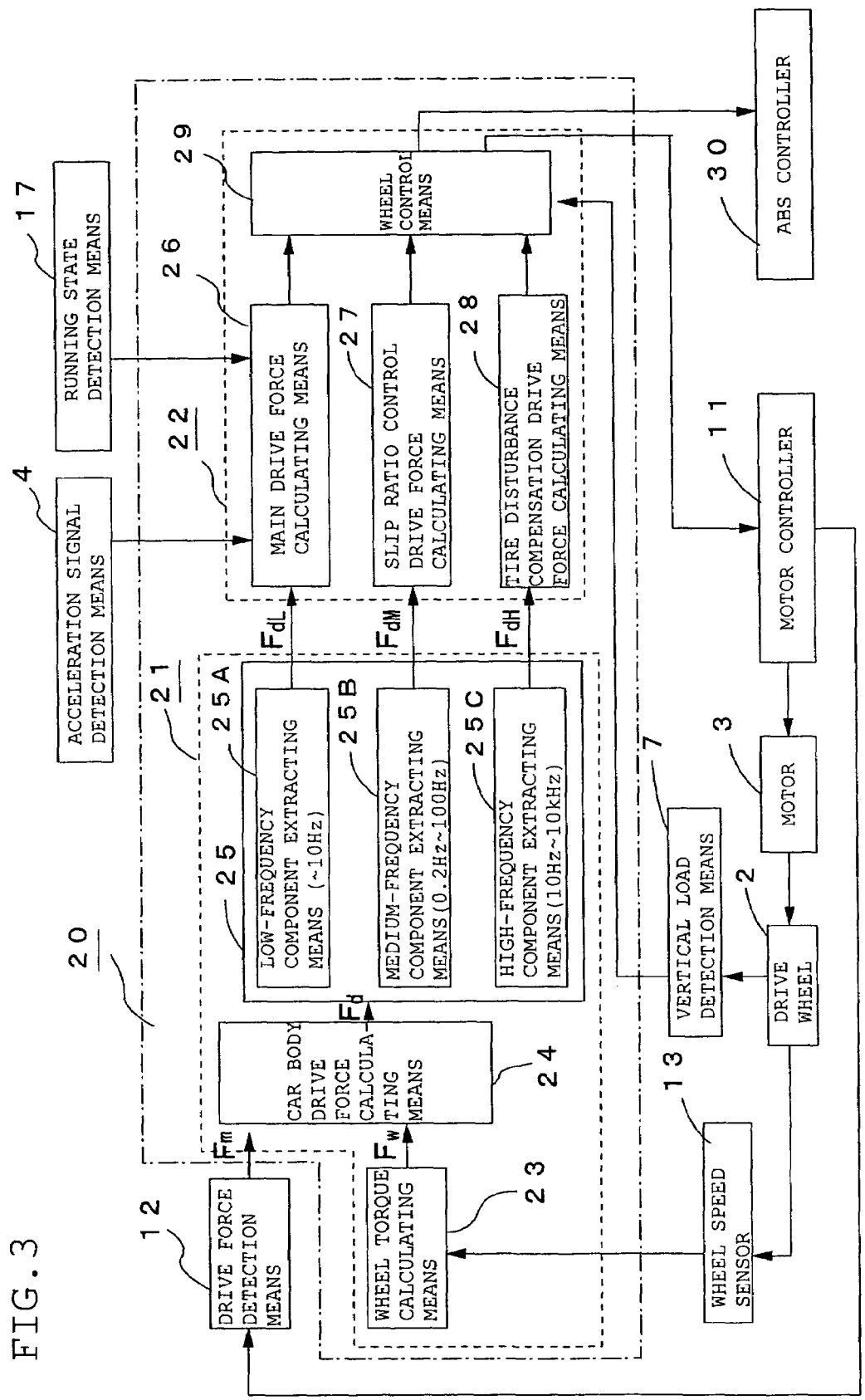
FIG. 3 is a diagram showing the constitution of drive force control means according to the embodiment.

FIG. 3 is a functional block diagram showing the constitution of the above running state control means 20. The car body drive force fluctuating component extraction unit 21 comprises wheel torque calculation means 23 for calculating the torque of each car wheel from the wheel speed detected by the wheel speed sensor 13 for detecting the speed of each drive wheel 2, car body drive force calculating means 24 for calculating car body drive force $F_d = F_m - F_w$ from drive force $F_m$ detected by the drive force detection means 12 for detecting drive force (drive or braking force) generated by the electric motor 3 and the wheel torque $F_w$ calculated by the above wheel torque calculating means 23, and car body drive force fluctuating component extracting means 25 for extracting multiple frequency band fluctuating components of the calculated car body drive force $F_d$. The drive or braking force control unit 22 comprises main drive force calculating means 26, slip ratio control drive force calculating means 27 and tire disturbance compensation drive force calculating means 28 for calculating main drive force, slip ratio control drive force and tire disturbance compensation drive force based on the above extracted fluctuating components of the car body drive force, respectively, and wheel control means 29 for driving or braking the left and right drive wheels 2L and 2R or applying vibration to the tires based on the above main drive force, slip ratio control drive force, tire disturbance compensation drive force and a vertical load from vertical load detection means 7.

The car body drive force fluctuating component extracting means 25 comprises low frequency component extracting means 25A for extracting a 10 Hz or lower frequency band component $F_{dL}$ of the above car body drive force $F_d$, medium frequency component extracting means 25B for extracting a 0.2 to 100 Hz frequency band component $F_{dM}$ of the above $F_d$, and high-frequency component extracting means 25C for extracting a 10 Hz to 10 kHz frequency band component $F_{dH}$, extracts multiple frequency band fluctuating components $F_{dL}$, $F_{dM}$ and $f_{dH}$ of the car body drive force $F_d$ and output the above $F_{dL}$ to the main drive force calculating means 26, $F_{dM}$ to the slip ratio control drive force calculating means 27 and $f_{dH}$ to the tire disturbance compensation drive force calculating means 28 of the drive or braking force control unit 22.

The main drive force calculating means 26 calculates main drive force for driving or braking the drive wheels 2 (left and right drive wheels 2L and 2R) based on the above $F_{dL}$, required drive force from the acceleration signal detection means 4, a change in steering properties from the running state detection means 17 and the results of judgment on car instability. The slip ratio control drive force calculating means 27 obtains the speed difference between car speed V calculated by integrating the above car body drive force $F_d$ and the detected wheel speed $V_w$ to calculate the slip ratio from this speed difference and slip ratio control drive force for controlling drive or braking force applied to each drive wheel 2 based on the above $F_{dM}$ and the above calculated slip ratio. The tire disturbance compensation drive force calculating means 28 calculates tire disturbance compensation drive force for compensating for disturbance applied to the tires with the above $f_{dH}$.

The wheel control means 29 calculates drive or braking forces applied to the left and right drive wheels 2L and 2R (drive wheels 2) from the above calculated main drive force and slip ratio control drive force and supplies them to the motor controllers 11 (left and right motor controllers 11L and 11R) to control the drive forces of the drive wheels 2, superimposes the above tire disturbance compensation drive force on the above drive or braking forces to suppress the above tire disturbance and controls a braking system such as the ABS controller 30 to apply braking forces to the drive wheels 2L and 2R and coupled wheels 1L and 1R.

A description is subsequently given of the operation of the above car control apparatus 10.

Figure 4:
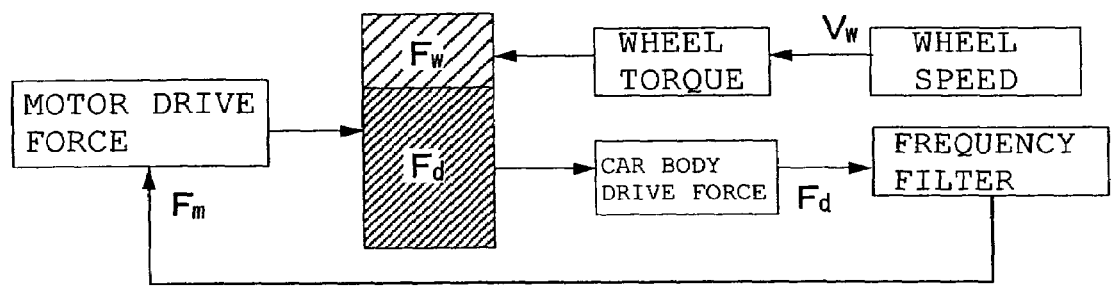
FIG. 4 is a diagram showing the control algorithm of car control of the present invention.
Figure 5:
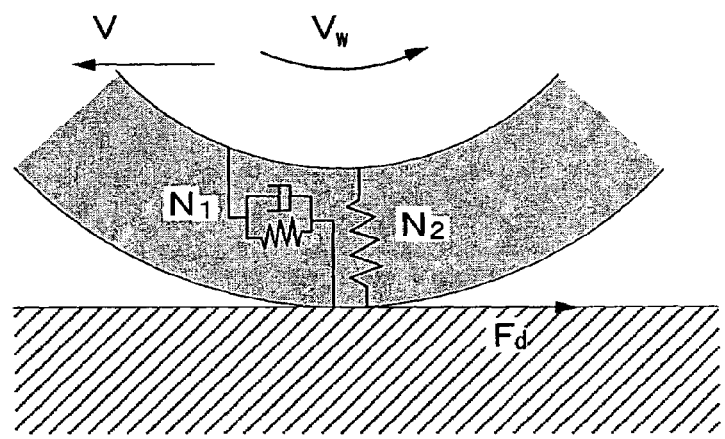
FIG. 5 is a diagram showing disturbance applied to a tire.

As shown in FIG. 4, drive force $F_m$ generated by the electric motor 3 is divided into wheel torque $F_w$ for turning each drive wheel 2 and car body drive force $F_d$ for moving forward the car body. Therefore, car body drive force $F_d = F_m - F_w$ generated on the tire contact surface is obtained from drive force $F_m$ generated by the electric motor 3 and obtained from the motor controller 11 and wheel torque $F_w$ obtained from a change in the wheel speed $V_w$ of the drive wheel 2 detected by the wheel speed sensor 13. As shown in FIG. 5, this car body drive force $F_d$ contains faster fluctuating components than a car body change, such as a fluctuating component caused by disturbance $N_1$ of the tire contact surface and a fluctuating component caused by the vibration $N_2$ of unsprung mass Then, in this embodiment, wheel torque $F_w$ is calculated from the wheel speed $V_w$ of the drive wheel 2 detected by the wheel speed sensor 13 by means of the wheel torque calculating means 23, car body drive force $F_d = F_m - F_w$ is calculated from drive force $F_m$ generated by the electric motor 3 and detected by the drive force detection means 12 and the above wheel torque $F_w$ by means of the car body drive force calculating means 24, and multiple frequency band fluctuating components of the above car body drive force $F_d$ are extracted by means of the car body drive force fluctuating component extracting means 25.

Stated more specifically, a 10 Hz or lower frequency band component $F_{dL}$ of the above car body drive force $F_d$ is extracted by the low-frequency component extracting means 25A, and drive or braking forces applied to the left and right drive wheels 2L and 2R are controlled to compensate for the difference between the car body speed V calculated from the above car body drive force $F_d$ and the detected wheel speed $V_w$ by means of the main drive force calculating means 26. As a result, the wheel speed $V_w$ becomes close to the car body speed V. At this point, the main drive force calculating means 26 calculates the optimum values of the main drive forces to be applied to the left and right drive wheels 2L and 2R so that the drive forces detected by the above drive force detection means 12 become the target drive forces based on the above $F_{dL}$, required drive force (target drive force) from the acceleration signal detection means 4, a change in steering properties from the running state detection means 17 and the result of judgment on car instability and outputs them to the left and right motor controllers 11L and 11R to control the left and right drive wheels 2L and 2R independently.

The medium-frequency component extracting means 25B extracts a 0.2 Hz to 100 Hz frequency band component $F_{dM}$ of the above $F_d$, and the slip ratio control drive force calculating means 27 calculates the speed difference between the car body speed and the wheel speed to calculate a slip ratio based on the above speed difference. The slip ratio control drive force for correcting the above drive force is calculated so that the above calculated slip ratio becomes a preset slip ratio and the above main drive force is corrected with the above slip ratio control drive force to control the slip ratio.

Stated more specifically, as drive force is not transmitted to the surface of a road having a low coefficient of friction when the car moves into this road such as a water pool from a normal road ($\mu \approx 1$) the wheels run idle. Therefore, the extracted wheel speed $V_w$ rises and the speed difference between the wheel speed $V_w$ and the car body speed V is produced by a rise in the fluctuating component of the extracted wheel speed $V_w$, thereby increasing the slip ratio. When the target slip ratio is represented by $\lambda$, slip ratio control drive force which ensures that the wheel speed $V_w$ becomes $V=(1-\lambda)V_w$ is obtained. As the car body speed V is calculated by integrating car body drive force $F_d$ as described above in this embodiment, it is possible to control the slip ratio without information on car body speed detected by the car speed sensor.

Since the low-frequency component extracting means 25A is used to extract a 10 Hz or lower frequency band component $F_{dL}$ of the car body drive force $F_d$ to control main drive forces for the left and right drive wheels 2L and 2R independently, thereby making it possible to suppress car instability which is difficult to be controlled with the slip ratio. The slip ratio control drive force does not become effective even when a change in time constant much faster than a time constant at the time of a change in the behavior of the car body is compensated for. In this embodiment, a 0.2 Hz to 100 Hz frequency band component $F_{dM}$ suitable for the control of the wheel speed is used to obtain slip ratio control drive force at that frequency band, thereby making possible the accurate control of the slip ratio.

Further, in this embodiment, the high-frequency component extracting means 25C extracts a 10 Hz to 10 KHz frequency band component $F_{dH}$, and the tire disturbance compensation drive force calculating means 28 calculates tire disturbance compensation drive force for compensating for a change in drive force caused by the disturbance $N_1$ of the above tire contact surface and the vibration $N_2$ of unsprung mass and applies this tire disturbance compensation drive force to the above wheel control means 29 to superimpose it on the main drive force. Thus, the influence of the disturbance of the tire contact surface or the vibration of unsprung mass is compensated for. The above disturbance may be suppressed by applying micro-vibration to the tires separately.

In general, when the control cycle becomes short, the control cycle becomes close to the response time constant of the tires. In this embodiment, each wheel (drive wheel) is not considered as an integrated unit of the wheel and a tire but disturbance applied to each tire is detected by extracting a drive force component having a frequency band caused by the dynamics of the tire to control the dynamic properties of the tire. The fluctuating component having the above frequency band of the drive force is generated between the tire and the road surface and much faster than the behavior of the car body and the operation speed of a driver and deteriorates the road holding properties of the tire. However, the high-frequency component extracting means 25C extracts a 10 Hz to 10 kHz frequency band component $f_{dH}$ to calculate tire disturbance compensation drive force and compensate for it, or applies micro-vibration to the tire based on the above tire disturbance compensation drive force to suppress micro-vibration generated between the tire and the road surface. Therefore, the road holding properties of the tire can be improved and driving stability can also be improved.

Stated more specifically, a 200 Hz or higher fluctuating component is extracted from the above 10 Hz to 10 kHz fluctuating component of the above car body drive force and compensated for to eliminate the influence of micro-vibration caused by the pattern block or sipe of the tread. A change in drive force at a tire dynamic frequency band (10 Hz to 200 Hz) lower than the above frequency band and caused by the natural vibration of the tire case due to the above disturbance is suppressed. Further, a 30 Hz to 100 Hz fluctuating component is extracted from the above fluctuating component of the car body drive force, and a change in drive force at a frequency near the resonance frequencies of the longitudinal spring and the front and rear springs of the tire which is increased by the above disturbance is suppressed.

Figure 7:
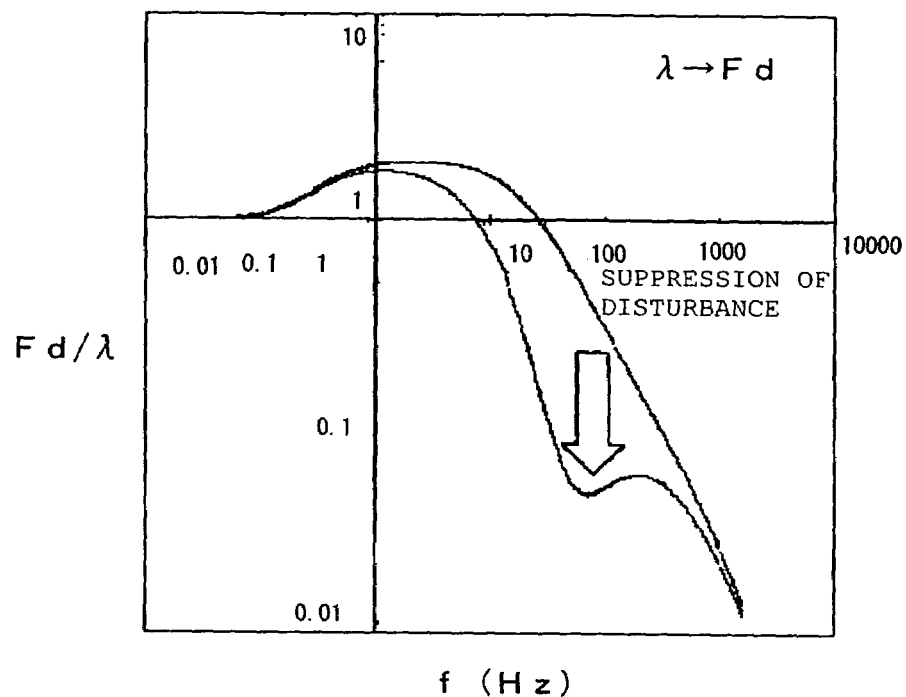
FIG. 7 is a diagram showing the transmission characteristics of car body drive force.

FIGS. 6(a) and 6(b) show the analytical results of the frequencies of drive force $F_m$ and wheel speed $V_w$ in the control of the prior art and the control of the present invention. As obvious from these figures, it is understood that the peak of disturbance including tire disturbance is eliminated from drive force $F_m$ and wheel speed $V_w$ by the control of the present invention. Since a 10 Hz to 1 kHz fluctuating component caused by the above tire disturbance of the car body drive force $F_d$ is suppressed by controlling the tire disturbance as shown in FIG. 7, it has been confirmed that the transmission characteristics of the car body drive force $F_d$ are also improved.

Since friction force between the tire and the road surface is in proportion to the vertical pressure (vertical load), to improve controllability, the above main drive force must be corrected to become proportional to the above vertical load.

In this embodiment, the above vertical load is detected by the vertical load detection means 7 to correct the main drive force. More specifically, as shown in FIG. 1, the normal accelerometers 8L and 8R are attached to the left and right drive wheels 2L and 2R to calculate forces applied to unsprung mass, and the suspension displacement meters 9L and 9R are attached to the suspensions to calculate forces applied to the suspensions from the displacements of the suspensions and displacement accelerations and to add up these two forces to calculate a displacement load. A load at a standstill obtained from the displacement of the suspension when the car is at a standstill is added to this displacement load to detect the above vertical load on a real-time basis.

A description is subsequently given of the turning stability control of the present invention.

The running state detection means 17 detects a change in steering properties from steering angle signals from the steering angle detection means 5 and yaw rate signals from the yaw rate sensors 6 to adjust the sizes of drive or braking forces for the left and right drive wheels 2L and 2R. In this embodiment, unlike the drive force control of the prior art, the left and right drive wheels 2L and 2R are controlled independently. That is, as the total of drive torques is constant in the control of the prior art, the drive torque of one drive wheel is limited by the other drive torque. In this embodiment, the left and right drive wheels 2L and 2R are driven or braked independently.

For instance, when the car speed becomes close to the critical speed for the turning radius and the behavior of the car body is changed to over-steering (O/S), the distribution of drive forces to the drive wheels 2L and 2R is controlled to change the behavior of the car body to under-steering (U/S), thereby keeping turning while suppressing spinning. In the present invention, the running state detection means 17 comprising the steering property detection means 15 and the car body instability judging means 16 is provided to detect a change in steering properties from steering angle signals and yaw rate signals in order to judge the instability of the car body and to control drive forces for the left and right drive wheels 2L and 2R according to the change in steering properties.

For instance, when the car speed becomes close to the critical speed for the turning radius, drive force on the inner side of turning is increased and drive force on the outer side of turning is reduced to generate drive force in the under-steering (U/S) direction. Since the tire stress becomes the largest and the vertical load on the outer side of turning becomes high when drive force is not generated, the car can be turned without impairing its turning speed by the control of turning in this embodiment.

Figure 8:
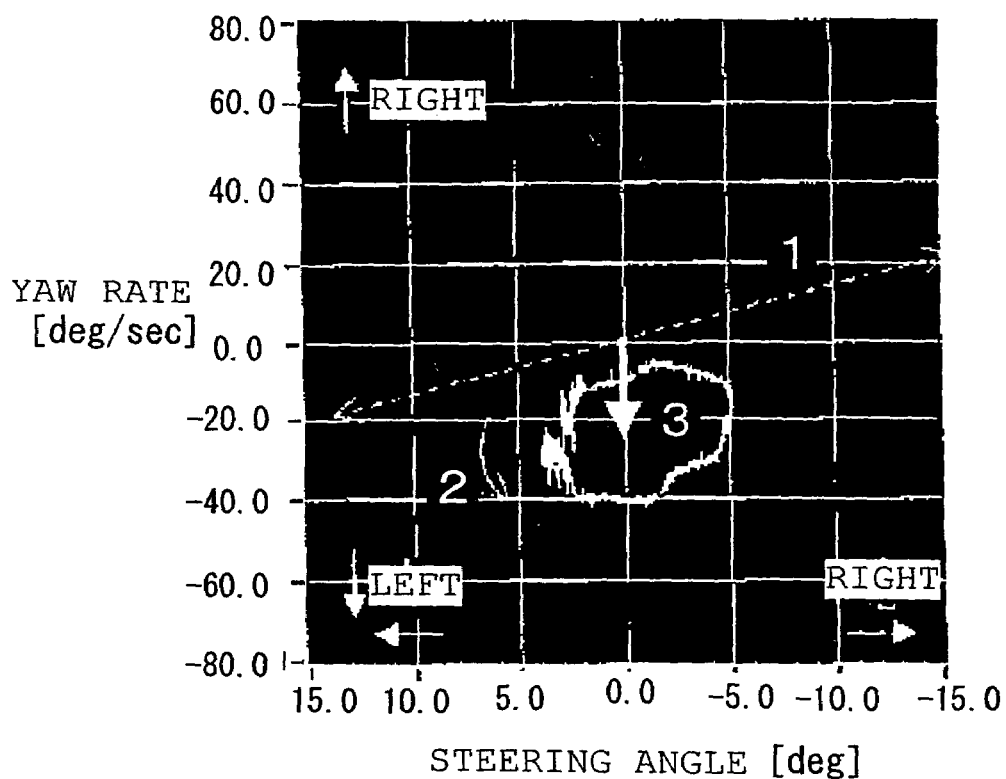
FIG. 8 is a diagram showing the method of judging the instability of the car body according to the present invention.

The car body instability judging means 16 judges the instability of the car body from the size of an instability parameter which is the distance between the broken line 1 showing the relationship between steering angle (deg) and yaw rate (deg/sec) at the time of normal operation determined by the characteristics of the car and the center point of the locus of a spinning point (X,Y) representing the steering angle (X coordinate) and yaw rate (Y coordinate) at the time of turning, represented by the arrow 3 in FIG. 8.

Since the spinning point (X,Y) is located below the broken line 1 in the figure and the car is turning to the left, the car tends to be over-steered. Therefore, when the above instability parameter is much larger than that of the above case and it is judged that the car body is unstable, drive force on the inner side of turning is increased and drive force on the outer side of turning is reduced in proportion to the above distance (instability parameter) while the current drive force is maintained. Thereby, the hysteresis of the steering angle decreases and both the operation ease and stability of the car can be improved.

When the car does not turn in only one direction but needs to change its direction abruptly, drive force is applied to the opposite (back) side according to circumstances not to impair driving stability. It is needless to say that the above slip ratio control, tire disturbance compensation and vertical load compensation are made on drive wheels in which drive force still remains to achieve car stability.

The electric motors 3L and 3R used in the present invention are preferably an outer rotor or inner rotor type direct drive in-wheel motor for directly driving or braking the drive wheels 2L and 2R as described above, respectively. However, as a double-inertia system is employed when the gears are back-crashed, unnecessary vibration is generated. Accordingly, a gearless direct drive in-wheel motor is preferably used. As the gearless direct drive in-wheel motor is free from the back-crash of the gears, control at a high frequency can be carried out without fail.

Figure 9:
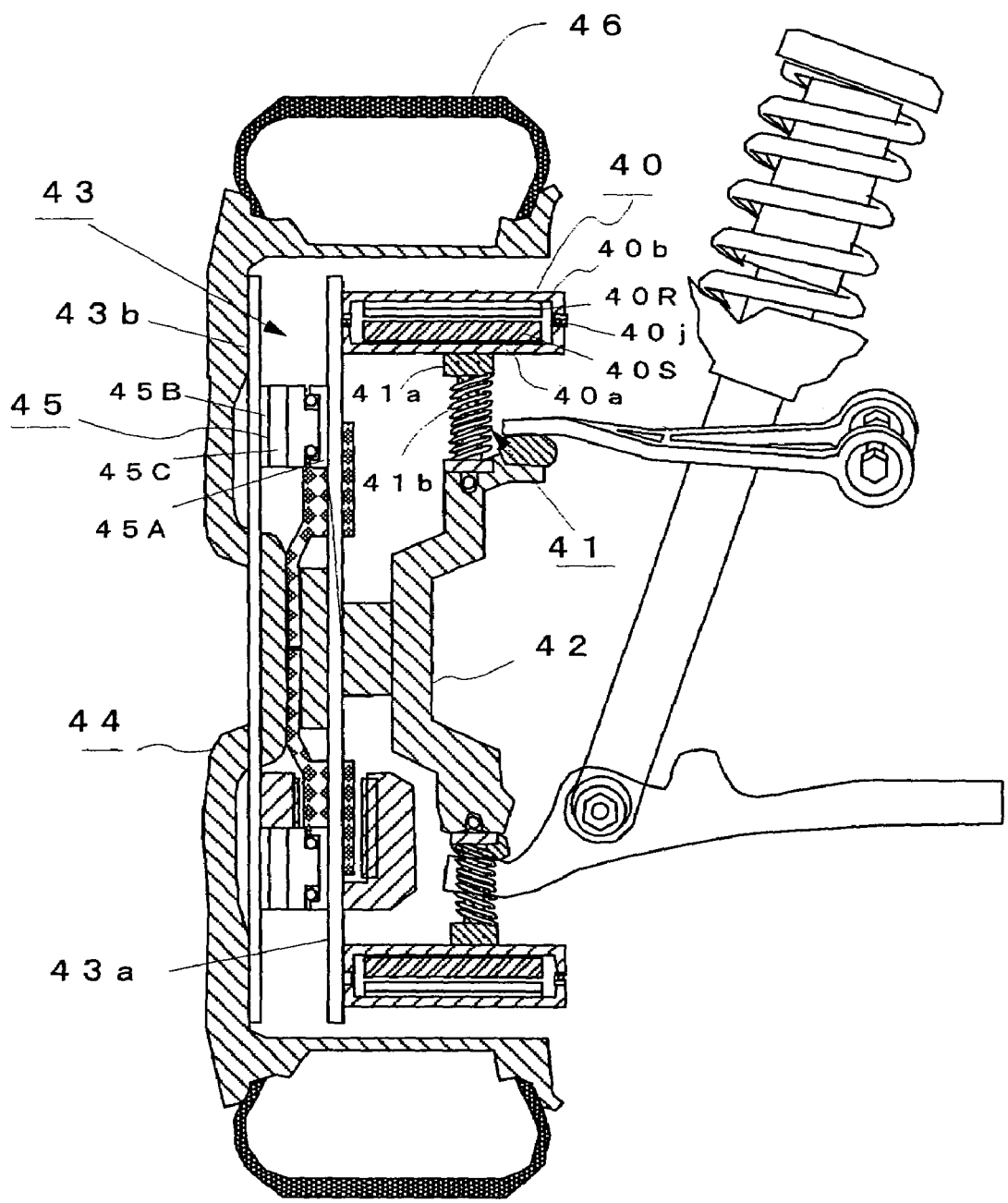
FIG. 9 is a diagram of a gearless direct drive in-wheel motor.

FIG. 9 is a diagram showing an example of the gearless direct drive in-wheel motor. In this in-wheel motor 40, a loop non-rotary case 40a holding a stator 40S and arranged on the inner side in the radial direction of the wheel and a loop rotary case 40b holding a rotor 40R and arranged concentric to and around the non-rotary case 40a are rotatably connected to each other by a bearing 40j. In this example, the above non-rotary case 40a is mounted to a knuckle 42 which is a car wheel part by a buffer mechanism 41 having a direct-driven guide member 41a and a shock absorber 41b comprising a spring member which expands and contracts in the moving direction of the direct-driven guide member 41a and a damper, and the above rotary case 40b is attached to the wheel 44 through a flexible coupling 43 so that the above in-wheel motor 40 functions as the weight of a dynamic damper for unsprung mass.

Figure 10A:
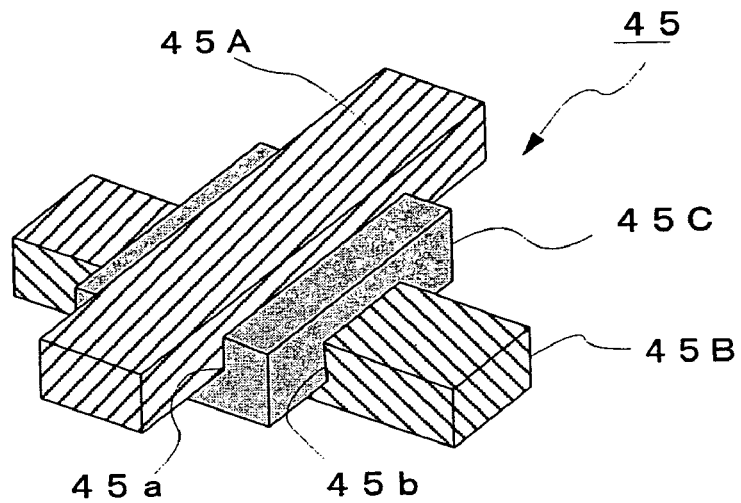
FIGS. 10(a) and 10(b) are diagrams of a flexible coupling used in the above in-wheel motor.

The above flexible coupling 43 comprises a hollow disk-like motor-side plate 43a, a hollow disk-like wheel-side plate 43b attached to the wheel 2 and a plurality of cross guides 45 for interconnecting the above plates 43a and 43b. Each of the cross guides 45 is a combination of crossing two-axis direct-driven guides as shown in FIG. 10(a), and a motor-side guide rail 45A and a wheel-side guide rail 45B can move in crossing directions along the guide grooves 45a and 45b of a cross guide body 45C.

Figure 10B:
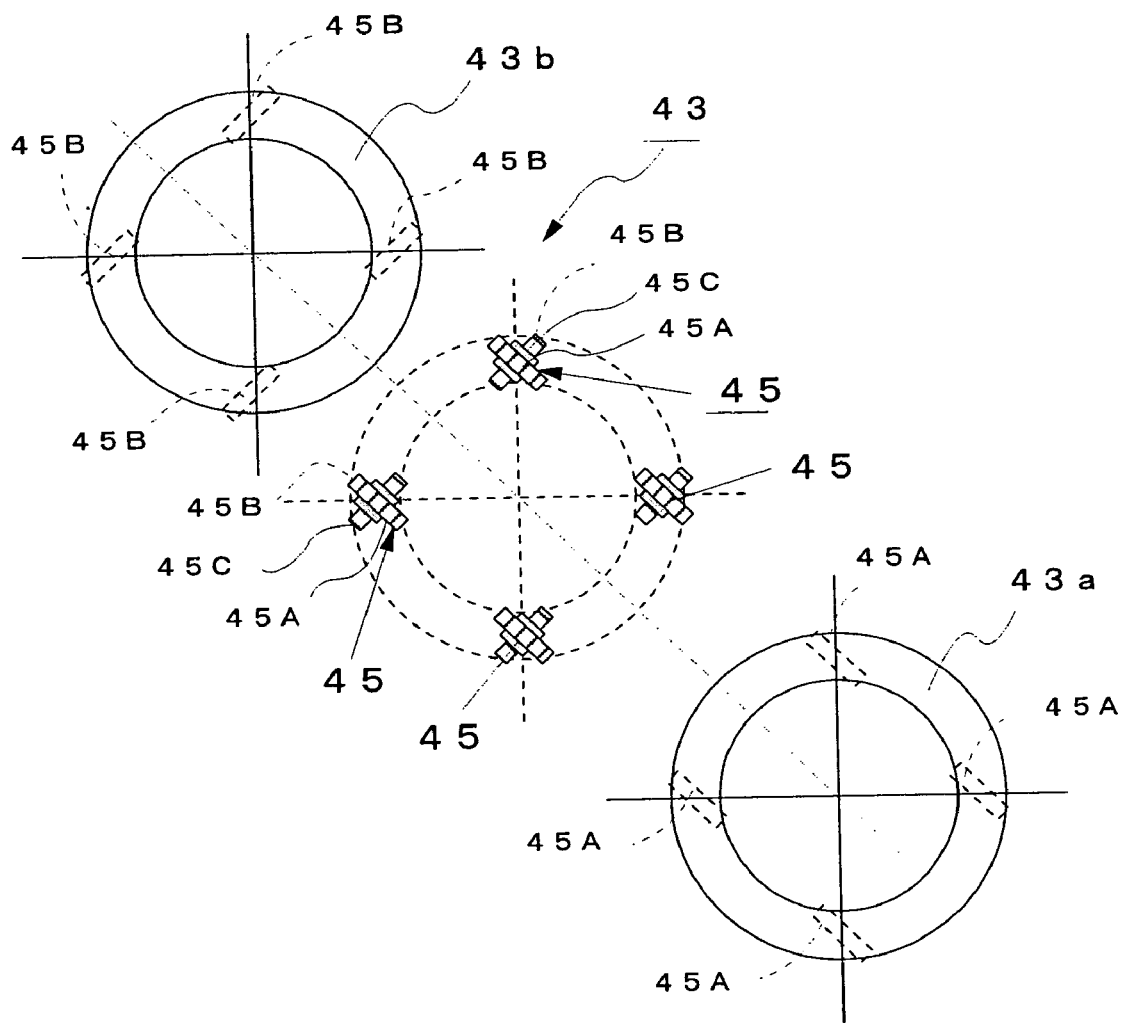

As shown in FIG. 10(b), the flexible coupling 43 has four cross guides 45 at equal intervals (90°) between the motor-side plate 43a and the wheel-side plate 43b, and the moving directions of the motor-side guide rails 45A of the above cross guides 45 are all at 45° from the radial direction of the above rotor 40R. Therefore, the moving directions of the motor-side guide rails 45A are all the same (45°), and the moving directions of all the wheel-side guide rails 45B become perpendicular to the moving directions of the motor-side guide rails 45A.

Accordingly, torque from the rotary case 40b of the in-wheel motor 40 is applied to the motor-side guide rails 45A through the motor-side plate 43a. The force in the circumferential direction applied to the motor-side guide rails 45A is transmitted to the wheel-side guide rails 45B through the cross guide bodies 45C to drive the wheel 44.

When the gearless direct drive in-wheel motor 40 is used as the electric motor and mounted to the knuckle 42 as a car wheel part by the buffer mechanism 41 as described above, and the rotary case 40b is attached to the wheel 44 through the flexible coupling 43, vibration caused by the disturbance of the contact surface applied from the tire 46 and vibration caused by fluctuations in the road holding force of the tire such as the vibration of unsprung mass can be suppressed. Therefore, as vibration applied to the wheel is further reduced, the frequency range to be controlled is narrowed, the degree of freedom of choosing a control frequency increases, and the fluctuation level itself becomes low, control at a high frequency range can be carried out easily and more stable and highly accurate control becomes possible.

According to this embodiment, the car control apparatus comprises the wheel speed sensor 13 for detecting the wheel speed $V_w$ of each drive wheel 2, the wheel torque calculating means 23 for calculating wheel torque $F_w$ from the above wheel speed $V_w$, the drive force detecting means 12 for detecting drive force $F_m$ (drive or braking forces) generated by the electric motor 3 for driving or braking the dive wheel 2, the car body drive force calculating means 24 for calculating car body drive force $F_d$ from the above drive force $F_m$ and the wheel torque $F_w$, the car body drive force fluctuating component extracting means 25 for extracting multiple frequency band fluctuating components of the above car body drive force $F_d$, and the drive or braking force control unit 22 for controlling the running state of the car by calculating main drive force for driving the drive wheel 2, slip ratio control drive force for controlling drive or braking force applied to the drive wheel 2 based on the slip ratio calculated from the speed difference between the car body speed and the wheel speed and tire disturbance compensation drive force for compensating for disturbance applied to the tire. The optimum drive force to be applied to the drive wheel 2 is calculated from the above calculated main drive force, slip ratio control drive force and tire disturbance compensation drive force and supplied to the motor controller 11 to drive or brake the drive wheel 2 and to apply micro-vibration to the tire in order to suppress micro-vibration generated between the tire and the road surface. Therefore, the car control apparatus can control the attitude of the car and the car speed without fail and can improve the road holding properties of the tires. Therefore, the driving stability can be improved and car control characteristics can also be improved.

Since the left and right drive wheels are controlled independently, the turning stability of the car can be improved.

The car control apparatus 10 further comprises the steering angle detection means 5 for detecting the steering angle of a steering system, the yaw rate sensor 6 for detecting the yaw rate of the car body, the steering property detection means 15 for detecting the changed condition of steering, that is, over-steering or under-steering from the above detected steering angle and yaw rate, and the car body instability judging means 16 for judging the instability of the car body from a change in the above steering properties. When it is judged that the car body is unstable, one or both of drive force on the inner side of turning and drive force on the outer side of turning are increased or reduced according to the change in steering properties, thereby making it possible to greatly improve the turning stability of the car.

Since the vertical load detecting means 7L and 7R for detecting a vertical load to be applied to each tire are provided to control the above drive force based on the detected vertical load, a change in friction force between the tire and the road surface caused by a change in the vertical load applied to the tire can be compensated for, thereby making it possible to further improve the controllability of the car.

In this embodiment, the electric car has been described. In the case of an engine-drive car, drive force and wheel torque are detected to calculate car body drive force, and multiple frequency band fluctuating components are extracted from a change in the car body drive force to control drive force applied to each drive wheel based on the extracted fluctuating components of the car body drive force. Thereby, the same effect as above can be obtained. Since the control cycle of the engine-drive car is longer than that of the electric car, a frequency band component including a frequency of 10 Hz to 1 kHz is extracted from the car body drive force to control the above drive force.

Although tire disturbance is compensated for by superimposing tire disturbance compensation drive force obtained by the tire disturbance compensation drive force calculating means 26 on the main drive force in the above embodiment, an actuator for applying micro-vibration in the revolution direction or width direction of the wheels to the drive wheels 2L and 2R or the coupled wheels 1L and 1R is provided and driven to apply micro-vibration to the tires based on the above calculated tire disturbance compensation drive force in order to reduce the influence of the above tire disturbance.

While a two-wheel drive car having rear wheels as drive wheels and front wheels as coupled wheels has been described in this embodiment, it is needless to say that the same control can be applied to a two-wheel drive car or four-wheel drive car. In this embodiment, the drive force detection means 12L and 12R detect drive forces generated by the electric motors 3 for driving the drive wheels 2L and 2R and output from the motor controllers 11L and 11R, respectively. The above drive forces generated by the electric motors 3 may be obtained by detecting the torques of the output shafts of the above motors 3 or by directly detecting the drive currents of the motors 3.

In the above embodiment, three frequency band fluctuating components are extracted from the fluctuating components of the car body drive force. The number and bandwidths of frequency bands used for control are not limited to those of the above embodiment and suitably determined by the performance and target specifications of the car.

Figure 11:
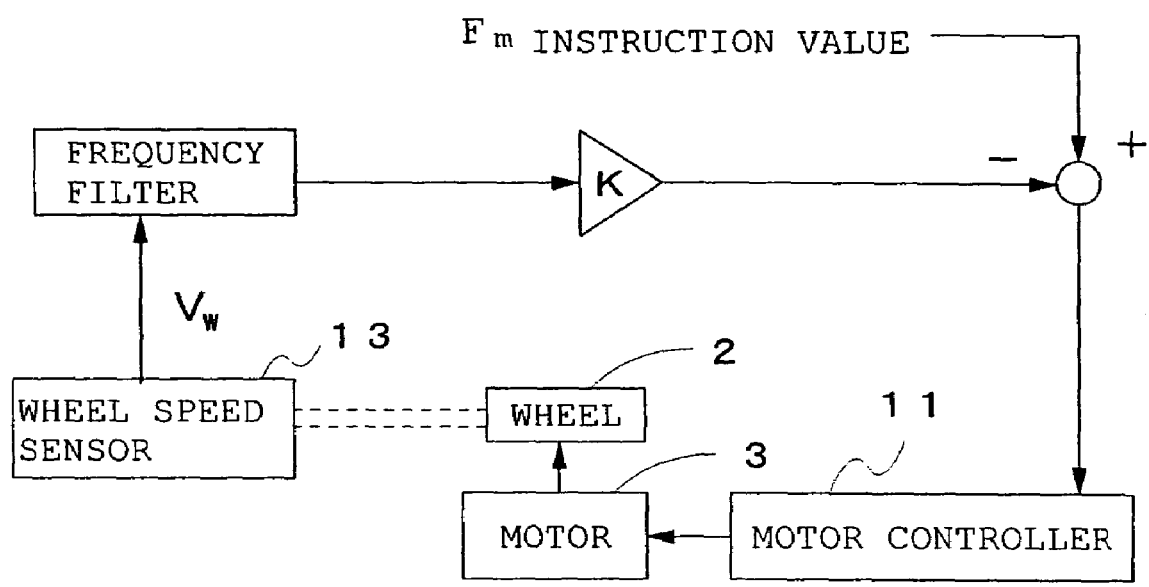
FIG. 11 is a diagram showing other control algorithm of car control of the present invention.
Figure 12:
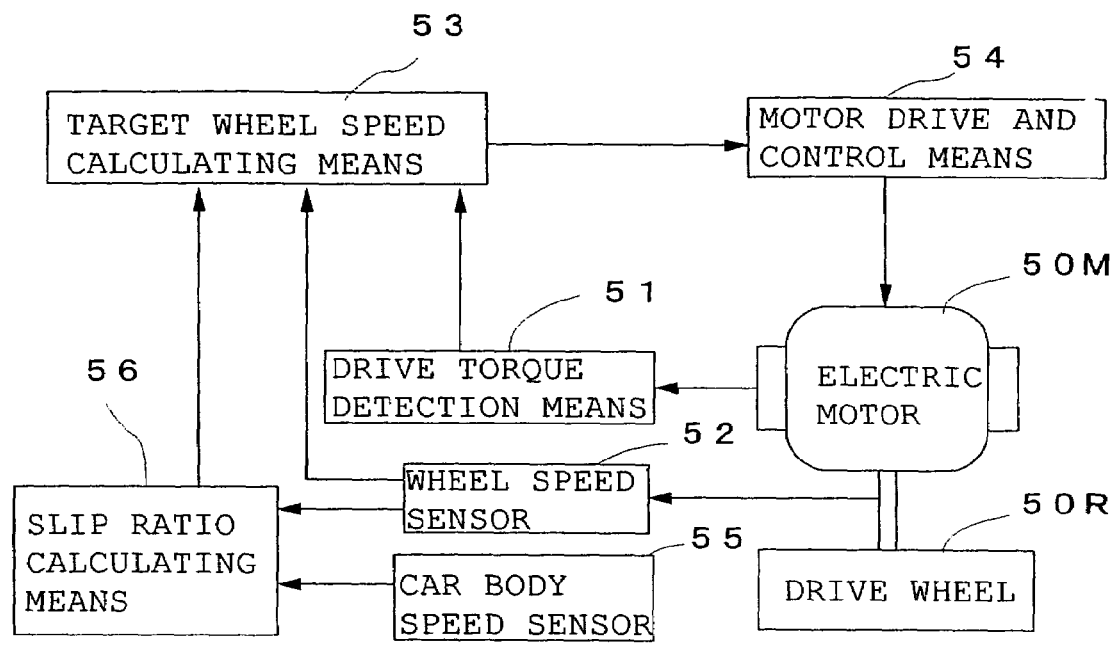
FIG. 12 is a block diagram showing the car control method of the prior art.

In the above embodiment, car body drive force $F_d$ is calculated from drive force $F_m$ and wheel torque $F_w$ generated by the electric motor 3 for driving or braking the drive wheel 2, and the drive wheel 2 is driven or braked based on the multiple fluctuating components of the above car body drive force $F_d$, or micro-vibration is applied to the tire. Since vibration caused by a change in the road holding force of the tire at a frequency band of 10 Hz to 10 kHz which is higher than the behavior of the car or the operation speed of a driver is reflected on a change in each wheel such as a change in the wheel speed or wheel torque, even when the change in the wheel is suppressed by detecting the change in the wheel itself and controlling drive or braking force for driving or braking the drive wheel with only the detected change in the wheel, the road holding properties of the tire can be fully improved. Stated more specifically, as shown in FIG. 11, the wheel speed of the drive wheel 2 is detected by the wheel speed sensor 13, a fluctuating component of the above wheel speed is extracted, drive force proportional to the fluctuating component of the above wheel speed is subtracted from the instruction value of drive force $F_m$ to be applied to the motor controller 11 for controlling the electric motor 3 in order to cancel a change in the wheel speed, that is, a change in the wheel caused by a change in the road holding force of the tire such as a fluctuating component caused by the disturbance $N_1$ of the tire contact surface or a fluctuating component caused by the vibration $N_2$ of unsprung mass. The fluctuating component of the wheel speed detected by the wheel speed sensor 13 used for control is a 10 Hz to 10 kHz frequency band fluctuating component as described above. Alternatively, in place of the above fluctuating component of the wheel speed, a fluctuating component of the wheel torque calculated from the wheel speed is obtained to control the above electric motor 3 so as to cancel this fluctuating component of the wheel torque.

EXAMPLE 1

To verify the effect of the present invention, a two-wheel independently controlling electric car is used as a test car to carry out a turning and running test so as to measure its critical turning speed. The friction coefficient of the test road was 0.4, and the radius of turning was 30 m. The car kept turning by increasing its car speed and the speed when the amount of steering exceeded a threshold value was taken as a critical speed. The test car was apt to be over-steered at a critical range. Therefore, when the car turned to the left, the steering angle indicator swung to the right so as to suppress spinning at the critical range. The speed when the steering angle indicator swung to the right was taken as the above critical speed.

Table 1 below shows the comparison of the critical speed between the control (no control) of the prior art and the control of the present invention. Control (1) means that tire disturbance compensation was made and control (2) means that both tire disturbance compensation and slip ratio control were made.

TABLE 1

| RESTRICTION CONDITION | CRITICAL SPEED |
| --- | --- |
| NO CONTROL | 40 |
| CONTROL (1) | 42 |
| CONTROL (2) | 44 |

As obvious from Table 1, the critical turning speed could be improved by 5 to 10% by the drive force control of the present invention.

Table 2 below shows the evaluation of a steering feeling at the above critical range obtained by the control of the prior art and by the control of the present invention (the absence of load compensation and the existence of load compensation) according to the 5-grade system. It was confirmed that the steering feeling obtained by the control under no load of the present invention is better than the control of the prior art and further improved by making load compensation.

TABLE 2

| RESTRICTION CONDITION | FEELING |
| --- | --- |
| NO CONTROL | 5 |
| CONTROL UNDER NO LOAD | 6 |
| CONTROL UNDER LOAD | 7 |

Table 3 shows the results of the occurrence of spinning caused by the control of the prior art, the control of drive force distribution of the present invention and independent control of each wheel (judgment on instability) when the test car was turned at 44 km/h.

TABLE 3

| RESTRICTION CONDITION | OCCURRENCE OF SPINNING (44 km/h) |
|---|---|
| NO CONTROL | OCCURRED |
| ONLY CONTROL OF DRIVE FORCE DISTRIBUTION | OCCURRED ACCORDING TO STEERING OPERATION |
| CONTROL OF DRIVE FORCE DISTRIBUTION + INDEPENDENT CONTROL OF EACH DRIVE WHEEL | NOT OCCURRED |

As shown in Table 3, when the car was turned at the same speed, spinning occurred in the case of the control of drive force distribution when the steering wheel was operated abruptly but the occurrence of spinning was avoided by adding the independent control of each wheel.

EXAMPLE 2

Control for suppressing a fluctuating component of the wheel torque as shown in Table 3 above was made on the test car based on only information on wheel speed and the test car was caused to run on a dry asphalt road to compare its driving stability with that of the control (no control) of the prior art. The results are shown in Table 4 below.

TABLE 4

| EXISTENCE OF CONTROL | EVALUATION |
|---|---|
| ABSENCE | +6 |
| EXISTENCE | +7 |

As obvious from Table 4, even when the running state of the car was controlled based on only information on wheel speed, it was confirmed that the results of sensor evaluation by the existence of control are superior to those of the prior art.

INDUSTRIAL FEASIBILITY

As described above, according to the present invention, drive force and wheel torque applied to each drive wheel are detected, car body drive force is calculated from the above detected drive force and wheel torque, at least one frequency band fluctuating component of the calculated car body drive force is extracted, and the wheel is driven or braked, or vibration is applied to the wheel based on the extracted fluctuating component of the car body drive force in order to control the running state of the car. Therefore, drive or braking force applied to the wheel can be suitably controlled, and the influence of disturbance micro-vibration applied to the tire can be compensated for. Accordingly, the road holding properties of each tire are improved and the driving stability of the car can be thus improved. Since the control of the attitude of the car and the car speed and the control of the slip ratio can be carried out at a suitable control frequency range, stable car control becomes possible.

What is claimed is:

1. A car control method comprising the steps of:
   detecting drive force and wheel torque to be applied to each drive wheel;
   calculating car body drive force by subtracting the wheel torque from the drive force;
   extracting at least one frequency band fluctuating component of the calculated car body drive force; and
   driving or braking the wheel or providing vibration to the wheel based on the extracted fluctuating component of the car body drive force to control the running state of the car.

2. The car control method according to claim 1, wherein multiple frequency band fluctuating components of the calculated car body drive force are extracted to control drive or braking force to be applied to the drive wheel based on the extracted fluctuating components of car body drive force.

3. The car control method according to claim 1 or 2, wherein drive force to be applied to the output shaft of the drive wheel is detected, and fluctuating components including at least a frequency band of 10 Hz to 1 kHz are extracted from car body drive force calculated from the drive force and wheel torque.

4. The car control method according to claim 1 or 2, wherein drive or braking force generated by a motor for driving or braking the drive wheel is detected, and fluctuating components including at least a frequency band of 10 Hz to 10 kHz are extracted from car body drive force calculated from the drive or braking force and wheel torque.

5. The car control method according to claim 3, wherein a 10 Hz to 200 Hz fluctuating component out of the fluctuating components of the car body drive force is extracted to suppress a change in the car body drive force.

6. The car control method according to claim 5, wherein a 30 to 100 Hz fluctuating component out of the fluctuating components of the car body drive force is extracted to suppress a change in the car body drive force.

7. The car control method according to claim 1, wherein left and right drive wheels are controlled independently.

8. The car control method according to claim 7, wherein the left and right drive wheels are controlled independently based on a change in steering properties.

9. The car control method according to claim 1, wherein the running state of the car is controlled based on a vertical load applied to each tire.

10. A car control apparatus comprising:
    means of detecting the wheel speed of each drive wheel;
    means of calculating wheel torque from the detected wheel speed;
    means of detecting drive force applied to the drive wheel;
    means of calculating car body drive force by subtracting the wheel torque from the drive force;
    means of extracting at least one frequency band fluctuating component from the calculated car body drive force; and
    running state control means for controlling the running state of a car based on the extracted fluctuating component of the car body drive force.

11. The car control apparatus according to claim 10, wherein drive or braking force generated by a motor for driving or braking the drive wheel is detected to detect drive or braking force applied to the drive wheel.

12. The car control apparatus according to claim 10 or 11, wherein the running state control means has means of driving or braking the wheel based on the extracted fluctuating component of the car body drive force.

13. The car control apparatus according to claim 12, wherein means of calculating the speed difference between the car body speed and the wheel speed by extracting a 0.2 Hz to 100 Hz frequency band fluctuating component of the car body drive force is provided to drive or brake the wheel based on the calculated speed difference.

14. The car control apparatus according to claim 10, wherein left and right drive wheels are controlled independently.

15. The car control apparatus according to claim 14, wherein means of extracting 10 Hz or lower frequency band fluctuating components of the car body drive forces of the left and right drive wheels are provided to control the left and right drive wheels independently based on the respective extracted fluctuating components.

16. The car control apparatus according to claim 15 which comprises means of detecting the steering angle of a steering system, means of detecting the yaw rate of the car body, means of detecting a change in steering properties from the detected steering angle and yaw rate and judging the instability of the car body and which drives or brakes one or both of a drive wheel on the inner side of turning and a drive wheel on the outer side of turning according to the change in steering properties when it is judged that the car body is unstable.

17. The car control apparatus according to claim 10, wherein the running state control means has means of applying vibration to the tire based on the extracted fluctuating component of the car body drive force.

18. The car control apparatus according to claim 17, wherein means of calculating disturbance applied to the tire by extracting a 10 Hz to 10 kHz frequency band fluctuating component of the car body drive force is provided to apply vibration to the tire based on the calculated disturbance.

19. The car control apparatus according to claim 18, wherein a 10 Hz to 200 Hz frequency band fluctuating component out of the fluctuating components of the car body drive force is extracted to suppress a change in the car body drive force.

20. The car control apparatus according to claim 19, wherein a 30 Hz to 100 Hz frequency band fluctuating component out of the fluctuating components of the car body drive force is extracted to suppress a change in the car body drive force.

21. The car control apparatus according to claim 10, wherein means of detecting a vertical load applied to the tire is provided to control the running state of the car based on the detected vertical load.

22. The car control apparatus according to claim 21 which further comprises means of detecting the displacement of a suspension, means of detecting the normal acceleration of the wheel and means of calculating the vertical load from the detected displacement of the suspension and the normal acceleration of the wheel.

23. The car control apparatus according to claim 14, wherein the motor is an in-wheel motor for driving the wheel with an electric motor attached to the wheel.

24. The car control apparatus according to claim 23, wherein the motor is a gearless direct drive in-wheel motor.

25. The car control apparatus according to claim 24, wherein the motor is attached to one or both of a portion below the car spring and the car body through a buffer member or buffer device.

26. The car control method according to claim 4, wherein a 10 Hz to 200 Hz fluctuating component out of the fluctuating components of the car body drive force is extracted to suppress a change in the car body drive force.

27. The car control apparatus according to claim 11, wherein left and right drive wheels are controlled independently.

28. The car control apparatus according to claim 12, wherein left and right drive wheels are controlled independently.

29. The car control apparatus according to claim 13, wherein left and right drive wheels are controlled independently.

* * * * *